(12) United States Patent
Regester

(10) Patent No.: US 10,876,310 B2
(45) Date of Patent: Dec. 29, 2020

(54) WATER TREATMENT AND PURIFICATION SYSTEM AND METHODS THEREOF

(71) Applicant: R&R Regester Enterprises, Inc., Divide, CO (US)

(72) Inventor: Robert C. Regester, Divide, CO (US)

(73) Assignee: R&R Regester Enterprises, Inc., Divide, CO (US)

( * ) Notice: Subject to any disclaimer, the term of this patent is extended or adjusted under 35 U.S.C. 154(b) by 0 days.

(21) Appl. No.: 16/363,500

(22) Filed: Mar. 25, 2019

(65) Prior Publication Data

US 2019/0218806 A1 Jul. 18, 2019

Related U.S. Application Data

(63) Continuation of application No. 14/775,708, filed as application No. PCT/US2014/031064 on Mar. 18, 2014, now Pat. No. 10,240,358.

(Continued)

(51) Int. Cl.
*E04H 4/12* (2006.01)
*C02F 1/50* (2006.01)
(Continued)

(52) U.S. Cl.
CPC .............. *E04H 4/1209* (2013.01); *C02F 1/50* (2013.01); *C02F 1/001* (2013.01); *C02F 1/281* (2013.01);
(Continued)

(58) Field of Classification Search
CPC .... E04H 4/1209; C02F 1/50; C02F 2201/007; C02F 2103/42; C02F 1/722; C02F 1/505; C02F 1/281; C02F 1/001
(Continued)

(56) References Cited

U.S. PATENT DOCUMENTS 2,936,893 A 5/1960 Arkoosh
4,416,854 A 11/1983 Nielsen
(Continued)

FOREIGN PATENT DOCUMENTS

WO WO 2014/153349 9/2014

OTHER PUBLICATIONS

"Rio Sea Salt Crystals," Datasheet [online], SaltWorks Inc., Mar. 9, 2013 (retrieved Jul. 12, 2014), retrieved from https://web.archive.org/web/20130109014859/https://www.saltworks.us/shop/product.asp?idProduct=135, pp. 1-3.

(Continued)

*Primary Examiner* — Fred Prince
(74) *Attorney, Agent, or Firm* — Scott J. Hawranek; Aspire IP

(57) ABSTRACT

A modular antimicrobial and antifungal treatment system for a spa or pool includes a main module. The main module comprising a transition metal mesh configured to allow fluid to enter and exit the main module. An anti-microbial and antifungal plastic material arranged in an interior portion of the main module. Individual modules in the main module includes a time release anti-bacterial, anti-fungal, or both, components, a sea salt component, and an adsorbent material. Further, a modular antimicrobial and antifungal treatment system for a spa or pool includes a support member coupled to the main module configured to hold the main module within an interior portion of a filter.

20 Claims, 12 Drawing Sheets

Related U.S. Application Data

(60) Provisional application No. 61/802,955, filed on Mar. 18, 2013, provisional application No. 61/871,044, filed on Aug. 28, 2013.

(51) Int. Cl.
*C02F 1/00* (2006.01)
*C02F 1/28* (2006.01)
*C02F 1/72* (2006.01)
*C02F 103/42* (2006.01)

(52) U.S. Cl.
CPC .............. *C02F 1/505* (2013.01); *C02F 1/722* (2013.01); *C02F 2103/42* (2013.01); *C02F 2201/007* (2013.01)

(58) Field of Classification Search
USPC .............. 210/167.01, 167.1, 167.11, 167.13, 210/167.19, 506
See application file for complete search history.

(56) References Cited

U.S. PATENT DOCUMENTS

| | | |
|---|---|---|
| 4,781,897 A | 11/1988 | Geron et al. |
| 5,019,173 A | 5/1991 | Gettings et al. |
| 5,019,254 A | 5/1991 | Abrevaya et al. |
| 5,626,854 A | 5/1997 | Ichii et al. |
| 5,980,752 A | 11/1999 | Bowers |
| 6,200,583 B1 | 3/2001 | Sibata et al. |
| 6,419,839 B1 | 7/2002 | Cox et al. |
| 6,440,405 B1 | 8/2002 | Cooper et al. |
| 7,048,864 B2 | 5/2006 | King et al. |
| 7,081,201 B2 | 7/2006 | Bassett et al. |
| 7,168,574 B2 | 1/2007 | King |
| 7,714,086 B2 | 5/2010 | Scheibel et al. |
| 7,732,395 B2 | 6/2010 | Moses et al. |
| 2002/0033365 A1* | 3/2002 | Patil .................. A61L 2/022 210/501 |
| 2003/0096017 A1 | 5/2003 | Decker et al. |
| 2004/0055939 A1 | 3/2004 | Wybo |
| 2005/0008613 A1 | 1/2005 | Peterson et al. |
| 2007/0108056 A1 | 5/2007 | Nyberg et al. |
| 2007/0241045 A1 | 10/2007 | Kott et al. |
| 2007/0289920 A1 | 12/2007 | Baker, Jr. et al. |
| 2008/0023385 A1 | 1/2008 | Baker, Jr. et al. |
| 2009/0001012 A1* | 1/2009 | Kepner .................. A01N 25/34 210/287 |
| 2009/0039030 A1 | 2/2009 | Revak |
| 2010/0176044 A1 | 7/2010 | Domb et al. |
| 2010/0181256 A1 | 7/2010 | Militz |
| 2010/0239674 A1 | 9/2010 | Kwak et al. |
| 2011/0220586 A1 | 9/2011 | Levitt |
| 2011/0229588 A1 | 9/2011 | Steimecke et al. |
| 2012/0225312 A1 | 9/2012 | Chin et al. |
| 2015/0360155 A1 | 12/2015 | Peterson, II et al. |
| 2016/0017622 A1 | 1/2016 | Regester |
| 2016/0128333 A1 | 5/2016 | Peterson et al. |

OTHER PUBLICATIONS

"Chemsorb Filter Granules," Datasheet [online], Filter Flow Technology, Inc., Feb. 18, 2007 (retrieved Jul. 12, 2014), retrieved from http://www.universalwater.net/chem2.pdf, pp. 1-5.

International Search Report for International (PCT) Patent Application No. PCT/US14/31064, dated Aug. 11, 2014, 2 pgs.

Written Opinion for International (PCT) Patent Application No. PCT/US14/31064, dated Aug. 11, 2014, 16 pgs.

Notification Concerning Transmittal of International Preliminary Report on Patentability and International Preliminary Report on Patentability Application No. PCT/US2014/031064, dated Oct. 1, 2015, 18 pages.

* cited by examiner

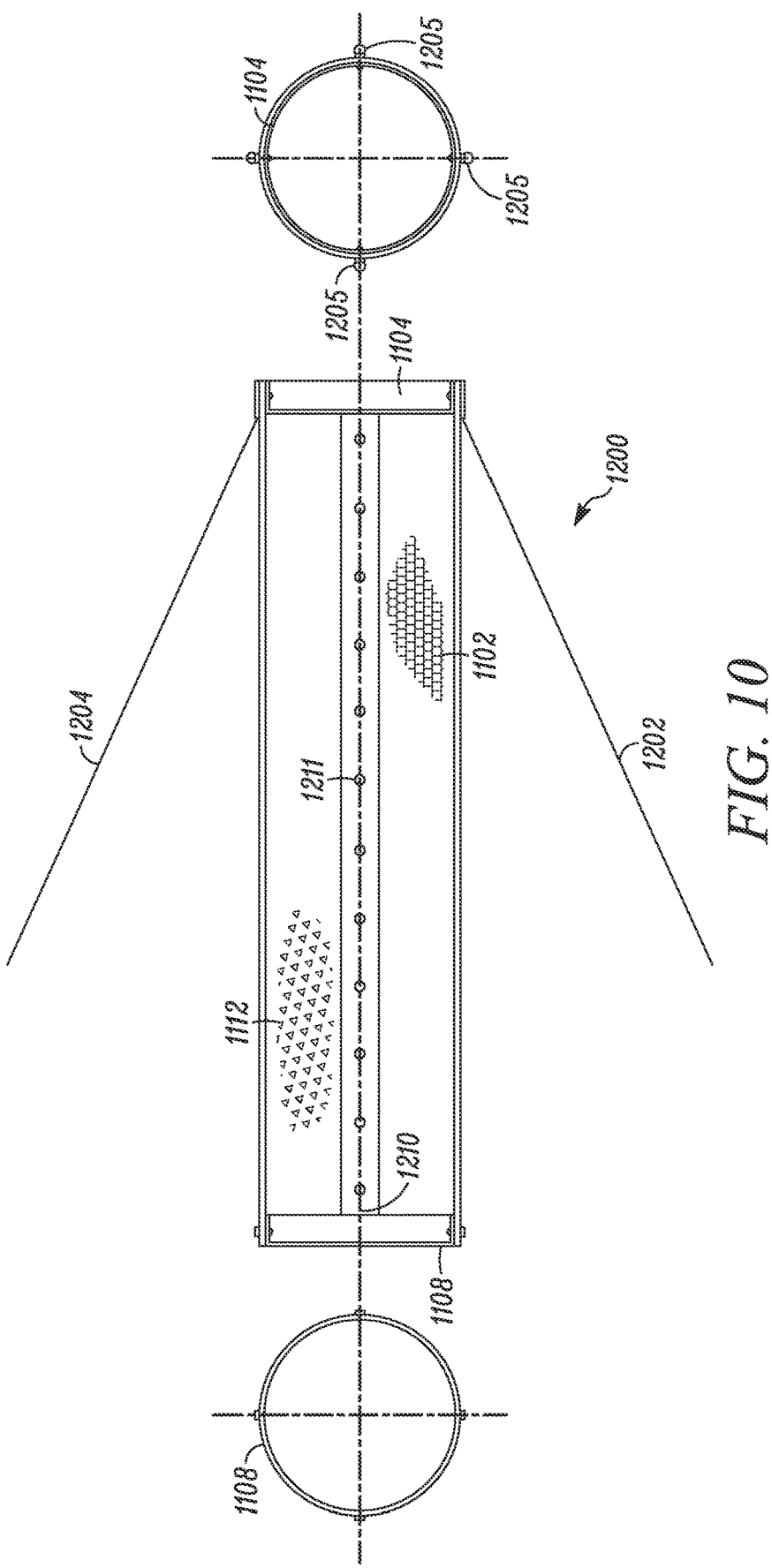

WATER TREATMENT AND PURIFICATION SYSTEM AND METHODS THEREOF

CROSS REFERENCE TO RELATED APPLICATIONS

This application is continuation of U.S. application Ser. No. 14/775,708 filed on Sep. 13, 2015, which is a National Stage of International Application No. PCT/US2014/031064, filed Mar. 18, 2014, which claims the benefit of U.S. Provisional Application No. 61/802,955, filed Mar. 18, 2013, and U.S. Provisional Application No. 61/871,044, filed Aug. 28, 2013, the contents of each application are fully incorporated by reference herein.

BACKGROUND OF THE INVENTION

Field of the Invention

The invention generally relates to a water treatment and purification system, and more particularly to a modular water treatment and purification system.

Description of the Related Art

Water treatment, purification, and sanitation are used in various water venues and applications, e.g., swimming pools, hot tubs, plunge pool, aquariums, and others, for maintain healthy conditions and water clarity and preventing the transmission of diseases. Sanitation methods includes filtration to remove pollutants and disinfection to kill microorganisms, including bacteria, fungi, and algae. To achieve the various goals of water sanitation, a variety of components may be needed, including various harsh chemicals which have environmental and health risks. There is a need for a system and method for the deployment of a water sanitation system with a variety of materials.

SUMMARY OF THE INVENTION

Accordingly, the invention is directed to a water treatment and purification system and methods thereof that substantially obviates one or more of the problems due to limitations and disadvantages of the related art.

An advantage of the invention is to provide a modular system configured to allow a user to have a natural alternative to reduce or eliminate the use of harsh chemicals in a spa or pool.

Yet another advantage of the invention is to provide a modular system configured to allow a user to have a disposable system.

Still yet another advantage of the invention is to provide a modular system configured to allow a user to have a convent mitigation system for naturally and/or organically purifying water of a spa or pool.

Yet another advantage of the invention is to provide a modular system configured to allow a user to have a refillable system for naturally and/or originally purifying water of a spa or pool.

Another advantage of the invention is to provide a modular system. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a modular antimicrobial and antifungal treatment system for a spa or pool includes a main module having a first closed end, a second resealable end, a third closed end and a fourth closed end, the main module comprising a transition metal mesh configured to allow fluid to enter and exit the main module. An anti-microbial and antifungal plastic material is arranged in an interior portion of the main module. A first module including a time released anti-bacterial, anti-fungal or both, component is arranged in the interior of the main module. A second module including a sea salt component is arranged in the interior of the main module. A third module including an adsorbent material is arranged in the main module. The modular system is disposable.

Another aspect of the present invention includes a modular system kit.

In another aspect, a modular antimicrobial and antifungal treatment system for a spa or pool treatment kit includes a main module having a first closed end, a second resealable end, a third closed end and a fourth closed end. The main module comprising a transition metal mesh configured to allow fluid to enter and exit the main module. The module antimicrobial and antifungal treatment system also includes an anti-microbial and antifungal plastic material arranged in an interior portion of the main module, a first module comprising a time release anti-bacterial, anti-fungal or both, component arranged in the interior of the main module, a second module including sea salt components arranged in the interior of the main module, a third module including an adsorbent material arranged in the interior of the main module, and a pH test strip or pH test kit.

In another aspect, an antimicrobial and antifungal treatment system for a spa or pool includes a bag including a first closed end, a second resealable end, a third closed end, and a fourth closed end. The bag includes a transition metal mesh configured to allow fluid to enter and exit the main module, an anti-microbial and antifungal plastic material arranged in an interior portion of the bag, a time release anti-bacterial, anti-fungal or both, component arranged in the interior of the bag, a sea salt component arranged in the interior of the bag, and an adsorbent material arranged in the interior of the bag.

In another aspect, a modular antimicrobial and antifungal treatment system for a spa or pool includes a main module including a first closed end and a second resealable end. The main module includes a transition metal mesh configured to allow fluid to enter and exit the main module. The modular antimicrobial and antifungal treatment system also includes a component arranged within an interior portion of the main module including one or more of anti-microbial material, antifungal material and a support member coupled to the main module configured to hold the main module within an interior portion of a filter.

In another aspect, a modular antimicrobial and antifungal treatment system for a spa, pool, and fish tank includes a main module having a first closed end and a second resealable end. The main module comprising a transition metal mesh configured to allow fluid to enter and exit the main module. The modular antimicrobial and antifungal treatment system also includes an anti-microbial and antifungal component module in an interior portion of the main module.

In another aspect, an antimicrobial and antifungal treatment system for a spa, pool, and fish tank includes a bag including a first closed end and a second resealable end. The bag includes a transition metal mesh configured to allow fluid to enter and exit the main module and is dimensioned to fit within a filter such that it does not move, substantially clog an inlet or outlet of a filter, or allows fixed positioning with the filter. The antimicrobial and antifungal treatment system also includes an anti-microbial and antifungal plastic material arranged in an interior portion of the bag.

In another aspect, a method of using a modular antimicrobial and antifungal treatment system for a spa or pool includes fitting a main module into an interior portion of a filter through the entrance and exit of the filter. The main module is held in the interior portion of the filter by a support member coupled to the main module. The main module including a first closed end and a second resealable end. The main module comprising a transition metal mesh configured to allow fluid to enter and exit the main module. A component is arranged within an interior portion of the main module including one or more of anti-microbial material, antifungal material. The method further includes fitting the filter through a slot of the spa or pool.

It is to be understood that both the foregoing general description and the following detailed description are exemplary and explanatory and are intended to provide further explanation of the invention as claimed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 10 illustrates an exemplary cross-sectional view of a main module according to another embodiment of the invention;

DETAILED DESCRIPTION OF THE ILLUSTRATED EMBODIMENTS

Figure 1:
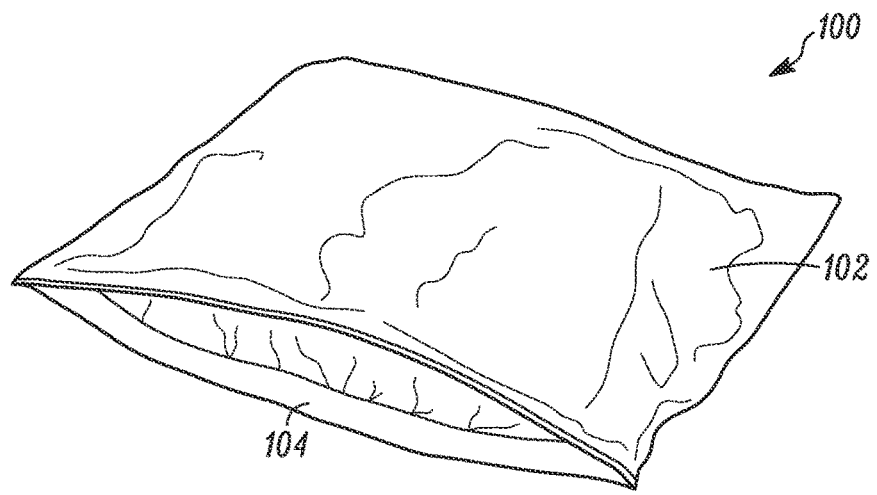
FIG. 1 illustrates an exemplary open perspective view of a main module according to an embodiment of the invention.

In order to more fully appreciate the present disclosure and to provide additional related features, each of the following references are incorporated herein by reference in their entirety:

(1) U.S. Pat. No. 4,781,897 by Geron, et al. discloses a dispenser which releases a substance such as chlorine into an aqueous solution such as the water of a swimming pool. The dispenser includes a bag or sachet which has a liquid permeable wall. The chlorine or other soluble material within the bag or sachet is dissolved or subjected to a leaching action in the liquid. In this manner the material is released into the liquid. The dispenser contains both a buoyant material and weighting material. The overall weight of the dispenser is such that it is immersed when initially deposited into the liquid and is buoyant in the liquid when the reactive material has dissolved.

(2) U.S. Pat. No. 5,019,254 by Abrevaya, et al. discloses filter pads useful for filtering and removing contaminants from fluids and comprising at least two pad layers of a permeable, nonwoven polymer material, where one pad layer is connected to another pad layer to form a pocket therebetween having an opening extending into the pocket and at least one of the pad layers has sufficient structural integrity or rigidity to maintain the shape of the filter pad in a filter apparatus during use. In addition, methods for removing contaminants from fluids comprise passing fluid through filter pads having a pocket having an opening extending therein.

(3) U.S. Pat. No. 5,980,752 by Bowers discloses water purification achieved by contacting the water with a container of charcoal, zeolite, and a bimetallic alloy. In a preferred embodiment, the three components are segregated from each other and contained in a bag having three compartments.

(4) U.S. Pat. No. 6,200,583 by Sibata, et al. discloses antimicrobial agents comprising 2,2,6,6-tetramethyl-4-piperidine derivatives. When added to resins, these antimicrobial agents provide antimicrobial resin compositions, which in turn provide antimicrobial articles. These antimicrobial agents provide resins, synthetic fibers, or the like with not only outstanding antimicrobial activity but also excellent heat resistance, weatherability, and deterioration resistance without impairing the transparency and safety of these materials.

(5) U.S. Pat. No. 6,419,839 by Cox, et al. discloses a carded nonwoven filter media comprising one or more layers of core-sheath fibers wherein the sheath portion of a fiber is bonded to one or more adjacent core fibers. In a preferred embodiment, the nonwoven filter media includes an antimicrobial fiber component.

(6) U.S. Pat. No. 6,440,405 by Cooper, et al. discloses quaternary ammonium functionalized dendrimers which are suitable for controlling the growth of microorganisms. The quaternary ammonium functionalized dendrimer biocides of the invention are effective against a wide variety of microbial species including bacteria, spores, yeast, fungi, mold, and multicellular microorganisms.

(7) U.S. Pat. No. 7,048,864 by King, et al. discloses a dendrimer complex comprising a dendrimer and an antimicrobial agent with the dendrimer complex placeable directly into a fluid to inhibit growth of microbes or rid the fluid of microbes. In a further embodiment of the invention the dendrimer complex is secured to a carrier, which is placed in a body of fluid and allowed to dispense the antimicrobial agent into the fluid. Once the antimicrobial agent is dispensed, the dendrimer complex can be removed and recycled to add functional groups to the dendrimer so that the dendrimer can be reused.

(8) U.S. Pat. No. 7,081,201 by Bassett, et al. discloses an encapsulated filter cartridge, which includes a filter assembly including a carbon block filter element and a microporous filter element. The filter cartridge has a permanently sealed sump defining an interior chamber configured to accommodate the filter assembly, the sump having an inlet for permitting unfiltered fluid to enter the interior chamber for communicating with the radially outer surface of the filter assembly and an outlet for permitting filtered fluid to exit the interior chamber from the axial portion of the filter assembly. The microporous filter element of the filter assembly may include a hollow fiber subassembly housed within the axial cavity of the carbon block element, said fiber subassembly including a plurality of hollow microporous fibers, or a pleated filter element surrounding the radially outer surface of the carbon block element.

(9) U.S. Pat. No. 7,714,086 by Bassett, et al. discloses polyvinyl alcohol co-polymers comprising co-monomers of carboxylic acid and carboxylic acid derivatives wherein the co-polymers further comprise an amino functional monomer, and water-soluble films and pouches formed therefrom.

(10) U.S. Patent Application Publication No. 2007/0241045 by Kott, et al. discloses a two-stage, tandem, replaceable filter cartridge assembly including an outer filter cartridge having a cylindrical shape and defining an axial bore therein, and an inner filter cartridge, also having a cylindrical shape which is received within the axial bore of the outer filter cartridge. The inner filter cartridge may be collapsible so that it can be easily inserted inside the axial bore of the outer filter cartridge, and is expandable so that in normal applications it rests up against the inner surface of the outer filter cartridge's core, if such is included, or filter medium. One or both of the filter media of the inner and outer cartridges may be formed from an antimicrobial material. In a second embodiment, each of the inner and outer filter cartridges has top and bottom end caps which respectively are structured to mate with one another to form seals therebetween to prevent or minimize the egress of water between the mating top and bottom end caps.

(11) U.S. Patent Application Publication No. 2007/0289920 by Baker, J R. et al. discloses a filter cartridge comprises a filter medium including a plurality of layers of a spunbond nonwoven fabric of continuous filaments. The filter medium may also include one or more additional layers such as a thermal or resin bonded carded nonwoven fabric, a hydroentangled nonwoven fabric or a fabric formed from caustic cotton fibers. The filter medium is formed into a pleated configuration. The filter medium may suitably comprise from 2 to 15 layers of the nonwoven fabric that are bonded to one another to form a relatively stiff multi-layer structure. The overall thickness of the filter medium is preferably from 0.25 to 3 mm.

(12) U.S. Patent Application Publication No. 2008/0023385 by Baker, J R. et al. discloses a nonwoven filtration medium comprising substantially continuous sheath/core bicomponent filaments arranged to form an open, porous, fluid permeable spunbond nonwoven fabric. The core component of the filaments comprises polyester or polypropylene and the sheath component comprises polyethylene having a melting temperature less than the melting temperature of the core component and including an organic antimicrobial agent incorporated therein. A multiplicity of bond sites are distributed uniformly throughout the fabric and defined by regions where the lower-melting sheath component has softened and flowed together at filament cross-over locations, with the individual being filaments spaced apart from one another except at the filament cross-over locations. The spunbond nonwoven fabric preferably has a thickness of about 10 to 40 mils and an air permeability from 150 to 270 cfm/ft.sup.2/min.

(13) U.S. Patent Application Publication No. 2010/0181256 by Militz discloses a use of a three-dimensional fiber system produced by textile manufacturing for antimicrobial treatment of process liquid in a process liquid system, wherein the fiber system has at least one first sheet-like structure and a plurality of spacer fiber elements extending transversely to the sheet-like structure in such a manner that the fiber system forms an elastically deformable three-dimensional spacer structure and a fiber having oligodynamic metal fractions is arranged in the sheet-like structure and/or in the region of the spacer fiber elements.

(14) U.S. Patent Application Publication No. 2012/0225312 by Chin, et al. discloses an antimicrobial coating and a product comprising the same. Also disclosed are processes for preparing the antimicrobial coating and the metal product comprising the coating.

Embodiments of the current invention are directed towards a non-toxic, natural modular system for treating spas and pools. One embodiment is directed towards a modular system including a main module having a first closed end, a second resealable end, a third closed end and a fourth closed end, the main module comprising a transition metal mesh configured to allow fluid to enter and exit the main module. An anti-microbial and antifungal plastic material is arranged in an interior portion of the main module. A first module including a time release anti-bacterial, anti-fungal or both, component is arranged in the interior of the main module. A second module including a sea salt component is arranged in the interior of the main module. A third module including an adsorbent material is arranged in the main module. The modular system is disposable.

Another embodiment includes a bag including a first closed end, a second resealable end, a third closed end and a fourth closed end. An anti-microbial and antifungal plastic material is arranged in an interior portion of the bag; a time release anti-bacterial, anti-fungal or both, component is arranged in the interior of the bag; a sea salt component is arranged in the interior of the bag; and an adsorbent material is arranged in the interior of the bag.

Yet another embodiment is directed towards a modular system including a main module having a first closed end, a second resealable end, and an internal portion configured to receive other modules and/or components.

In any embodiment, more or less of the materials may be included in the system, e.g., two modules instead of three modules. Moreover, any combination of materials may be included in any one of the modules or in just one module.

In any embodiment, any of the components/materials disclosed herein may be utilized in the system with or without any other materials, e.g., mixing and matching components, to create a water treatment and purification system.

Reference will now be made in detail to an embodiment of the present invention, example of which is illustrated in the accompanying drawings.

Figure 2:
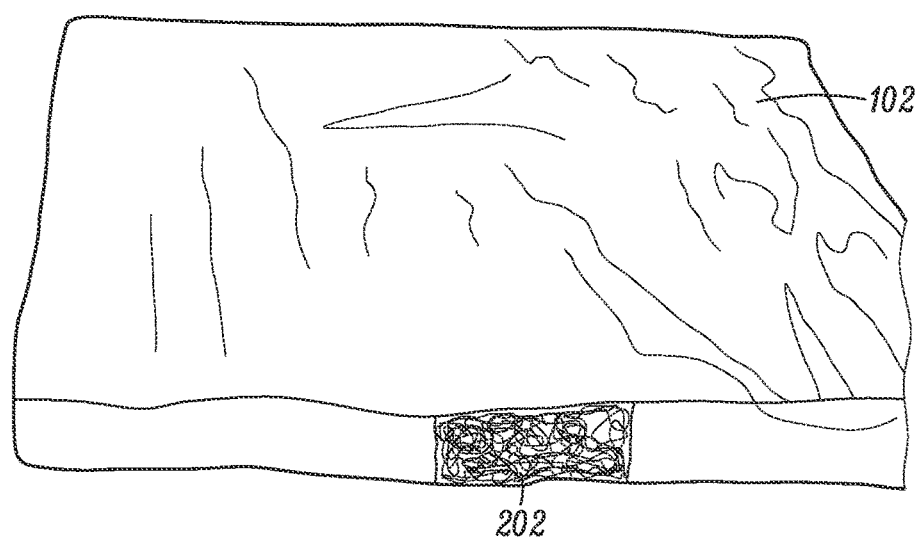
FIG. 2 illustrates an exemplary end view of the main module of FIG. 1 with a cutout section.

FIG. 1 illustrates an exemplary open perspective view of a main module according to an embodiment of the invention. FIG. 2 illustrates an exemplary end view of the main module of FIG. 1 with a cutout section.

Referring to FIGS. 1-2, the main module is generally depicted with reference to number 100. The module includes transition metal mesh 102 configured to allow fluid to enter and exit the main module and resealable end 104. The resealable end 104 may include any temporary coupling mechanism, e.g., hook and loop, zipper, snaps, buttons, folds, and combination of the same. The other sides of module are sealed or closed.

A portion of the module may include a fabric material, e.g., cloth, or strips of fabric material. In one embodiment a first side of the module is fabric and a second side is transition metal mesh. The mesh size is about ¼ inch or less. In a preferred embodiment, the metal mesh size includes about 100 to about 200 holes per inch mesh. The main module has a preferred length of about 7 inches to about 9 inches, width of about ½ inch to about 2 inches, and height of about 10 inches to about 14 inches. In another embodiment, the size of the system depends on the amount of water being treated, i.e., the larger volume of water being treated the larger the size of the system.

The transition metal mesh may include any transition metal with antibacterial or antimicrobial effects, e.g., a transition metal oxide, a transition metal salt, silver, silver oxide, silver salt, and combinations of the same. In a preferred embodiment, the transition metal includes copper or a coppery alloy. The metal mesh or fabric may be impregnated, laced, and/or coated with anti-microbial and/or antifungal materials. Moreover, the transition metal may be utilized as a component to one of the modules in any shape, e.g., mesh, non-mesh and the like.

Examples of transition metal salts suitable for use in the invention include, but are not limited to, AgCl, AgBr, AgI, $Ag_2S$, $Ag_3PO_4$, $NaAg_2PO_4$, CuS, and $NaCuPO_4$. Other examples of silver compounds include, but are not limited to, $AgNO_3$, $Ag_2CO_3$, AgOAc, $Ag_2SO_4$, $Ag_2O$, $[Ag(NH_3)_2]Cl$, $[Ag(NH_3)_2]Br$, $[Ag(NH_3)_2]I$, $[Ag(NH_3)_2]NO_3$, $[Ag(NH_3)_2]_2SO_4$, silver acetoacetate, a silver benzoate, a silver carboxylate, and silver amine complexes such as $[Ag(NR_3)_2]X$, where R is an alkyl or aryl group or substituted alkyl or aryl group and X is an anion such as, but not limited to, $Cl^-$, $Br^-$, $I^-$, $OAc^-$, $NO_3^-$ and $SO_4^{2-}$.

Anti-microbial and/or antifungal plastic materials 202 are arranged inside the main module 100. The plastic materials are configured in a mesh structure, thereby increasing the surface area and contact with a fluid in use. The plastic materials are configured to inhibit the growth of odor causing bacteria, fungus and mold and are non-allergenic. In one embodiment, the main module includes this plastic material in a bag form and excludes the transition metal, i.e., the anti-microbial bag replaces the metal mesh. The bag is configured in a mesh sized to allow fluid to pass through the bag.

In a preferred embodiment, the antimicrobial plastic includes an antimicrobial agent incorporated into a thermoplastic fiber, e.g., a recycled poly ethylene teraphlate fiber made from recycled plastic bottles. The fiber can be spun into any shape, e.g., bag, mesh, combinations of the same and the like. The antimicrobial agent may include a bacteriostic material configured to inhibit growth and/or bacteriocidal material configured to kill or minimize bacteria.

Figure 3:
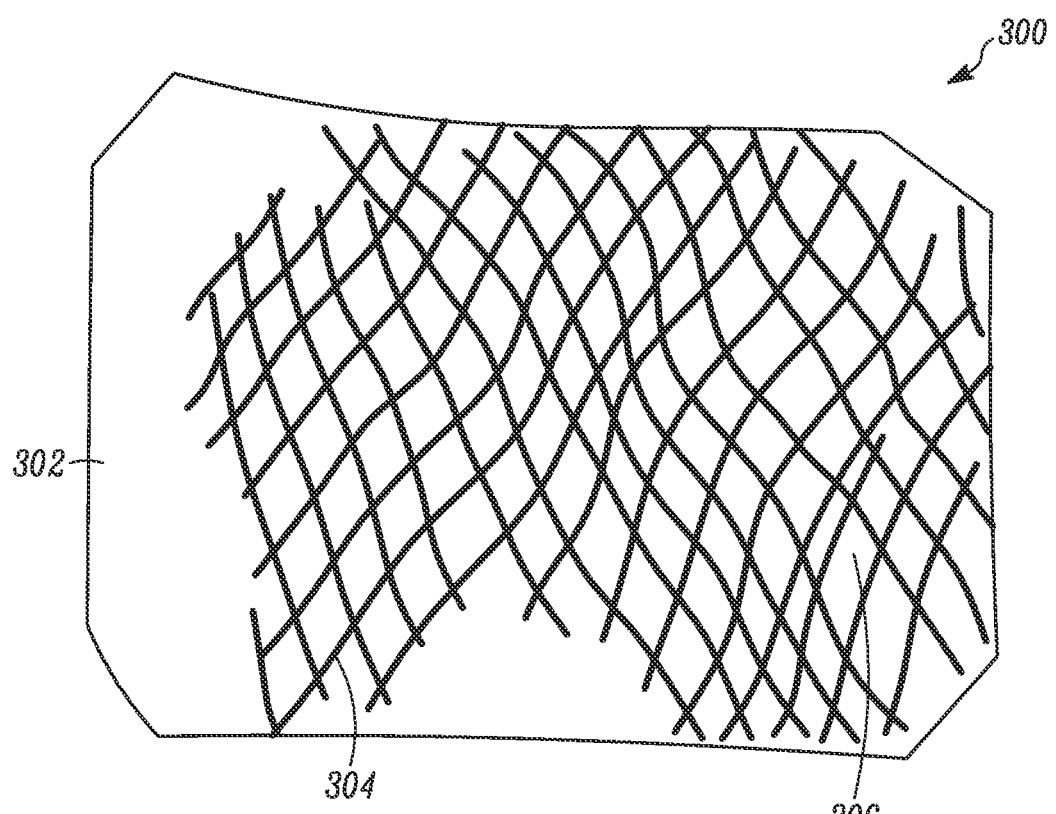
FIG. 3 illustrates an exemplary end view of antimicrobial mesh integrated in a module according to another embodiment of the invention.

FIG. 3 illustrates an exemplary end view of antimicrobial mesh integrated in a module according to another embodiment of the invention. In this embodiment, an antimicrobial plastic fiber or mesh 304 is melted into the copper mesh 302 used in any module, e.g., main module 100. The mesh 302 may include any pattern 306 and in this embodiment includes a diamond pattern. Preferably, the pattern is configured to allow fluid to penetrate the module 302. In another embodiment, the transition metal is coated with materials as described in U.S. Patent Application Publication No. 2012/02555312, which is hereby fully incorporated by reference.

Figure 4:
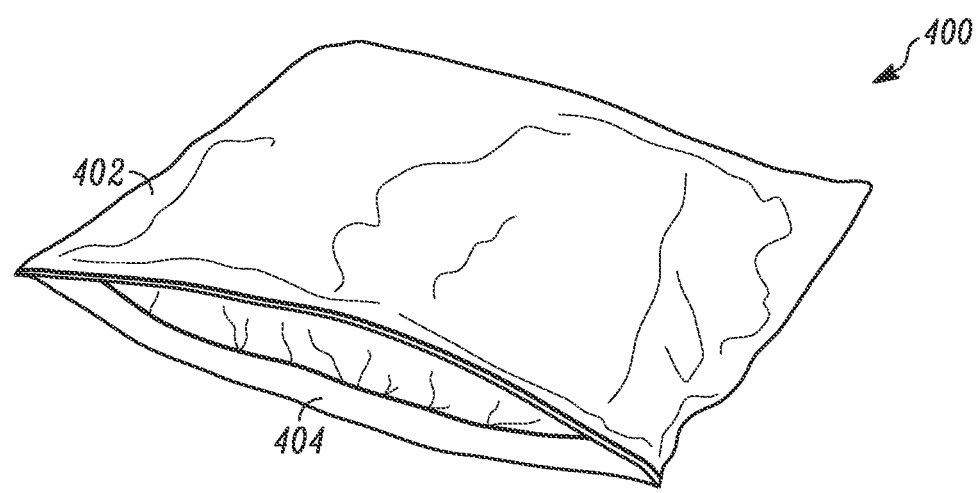
FIG. 4 illustrates an exemplary open perspective view of a first internal module according to an embodiment of the invention.

FIG. 4 illustrates an exemplary open perspective view of a first internal module according to an embodiment of the invention.

Referring to FIG. 4, the first module is generally depicted with reference to number 400. The first module 400 is configured to fit within the main module 100. The first module includes transition metal mesh 402 configured to allow fluid to enter and exit the main module and resealable end 404. The resealable end 404 may include any temporary coupling mechanism, e.g., hook and loop, zipper, snaps, buttons, folds, and combination of the same. The other sides of the module are sealed or closed. The first module 400 may be constructed of and include any material as described with respect to the main module 100 in FIGS. 1-3 above.

The first module 400 is configured to receive time released natural anti-bacterial and anti-fungal components including tea tree oil, pine tree oil or materials, e.g., pine needles, aloe vera, aloe vera oil, colloidal silver, meso silver, citrus materials, hydrogen peroxide, e.g., organic hydrogen peroxide, and combinations of the same. These materials may be in any form, e.g., powder form, solid form, liquid form, coated on a substrate, e.g., cloth material, and any combinations of the same. Moreover, these materials may be in separate disposable bags, e.g., cloth bags, inside the first module. The first module 400 may also be disposable. The first module 400 may include these components in a non-resealable module.

In one embodiment, the anti-bacterial and anti-fungal components include a zeolite filter media. The zeolite filter media includes a zeolite material, e.g., analcime ($Na_{16}[Al_{16}Si_{32}O_{96}] \cdot 16H_2O$), chabazite ($Ca_{0.5},Na,K)_4[Al_4Si_8O_{24}] \cdot 12H_2O$), clinoptilolite ($(Na,K)_6[Al_6Si_{30}O_{72}] \cdot 20H_2O$), erionite ($K_2(Na,Ca_{0.5})_8[Al_{10}Si_{26}O_{72}] \cdot 28H_2O$, heulandite ($(Na,K)Ca_4[Al_9Si_{27}O_{72}] \cdot 24H_2O$), laumontite ($Ca_4[Al_8Si_{16}O_{48}] \cdot 18H_2O$), mesolite ($Na_{16}Ca_{16}[Al_{48}Si_{72}O_{240}] \cdot 64H_2O$), scolecite $Ca_8[Al_{16}Si_{24}O_{80}] \cdot 24H_2O$, stilbite ($NaCa_4[Al_9Si_{27}O_{72}] \cdot 30H_2O$), or other zeolite material (generally $M_{2/n}O[Al_2O_3 \cdot xSiO_2] \cdot yH_2O$, wherein M is any number of metals including Na, Li, Ka, Ca, and Mg, n is the valence of the metal cation, and x and y are the number of $SiO_2$ and $H_2O$, respectively.

In a preferred embodiment, the composition of the zeolite filter media is 90%±5% of primarily clinoptilolite, e.g., hydrated sodium potassium aluminosilicate. In one embodiment, the zeolite filter media includes products known by ZEOBEST® Ultra. In another embodiment, the zeolite filter media is 90%±5% zeolite material and the filter includes this material.

The zeolite filter media may also include a number of anti-bacterial and anti-fungal agents. which includes copper-containing alloy products and other suitable products. For example, the zeolite filter media may include one or more active ingredients, which includes octadecylimethyl trihydroxysilyl propyl ammonium chloride (EPA Reg. No. 70087-E), e.g., Zoonocide®, 3-(trimethoxysilyl) propyldimethyloctadecyl ammonium chloride (EPA Reg. No. 88999-1), e.g., Sanitect, or other products as known now or may be derived in the art. The anti-bacterial and anti-fungal products may include various mixtures of active and inert ingredients. For example, a Zoonocide® filter media may contain 0.1% octadecylimethyl trihydroxysilyl propyl ammonium chloride and 99.9% inert ingredient. In another example, Sanitect agent may contain 72% 3-(trimethoxysilyl) propyldimethyloctadecyl ammonium chloride and 28% inert ingredient. The products may also contain a significant portion of a material, i.e., Sanitect agent may contain 12% methanol. The active ingredient of a zeolite filter media may be derived from plant base carbonate.

In an embodiment, the anti-bacterial and anti-fungal agents may be used to destroy or inactivate a number of various pathogens, including gram positive bacteria, gram negative bacteria, fungi, algae, mold, yeast, spores, protozoa parasites, and viruses. For example, Sanitect may be used against a number of pathogens, as follows: gram positive bacteria, e.g., *Bacillus* sp. (vegetative cell), *Bacillus subtilis, Clostridium difficule, Corynebacterium diptheriae, Enterococcus* sp. (incl. VRE), *Micrococcus* sp., *Mycobacterium tuberculosis, Mycobacterium smegmatis, Propionibacterium acnes, Staphylococcus aureus, Staphylococcus aureus* (MRSA), *Staphylococcus epidermis, Streptococcus faecalis, Streptococcus mutans, Streptococcus pneumonia, Streptococcus pyogenes*; gram negative bacteria, e.g., *Actinetobacter aerogenes, Actinetobacter calcoaceticus, Aerobacter aerogenes, Aeromonas hydrophilia, Citrobacter deversus, Citrobacter freundi, Enterobacte aerogenes, Enterbacter aglomerans, Enterbacter cloacae, Enterococcus* sp., *Escherichia coli, Klebsiella oxytoca, Klebsiella pneumoniae, Klebsiella terriena, Legionella pneumophila, Morganeella morganii, Mycobacterium tuberculosis, Proteus mirabilis, Proteus vulgaris, Pseudomonas aeruginosa, Pseudomonas fluorscens, Psuedomonas pulida, Salmonella cholera suis Salmonella typhimunium, Salmonella typhosa, Serratia liquifaciens, Serratia marcescens, Treponema hyodysenteriae, Xanthomonas campestris*; fungi, algae, mold, yeast, and spores, n e.g., *Alterania* alternate *Aphanizomenon* sp. *Aspergillus flares, Aspergillus flavus, Aspergillus niger, Aspergillus sydowii, Aspergillus terreus, Aspergillus versicolor, Aspergillus verrucari, Anabaena cylindrica, Aureobasidium pullans, Candida albicans Candida pseudotropocalis, Cephaldascus fragans, Chaetomium globsum, Chlorophyta protococcus, Phlorophyta selenastrum, Chlorophyta* sp., *Chrysophta* sp. *Chlorella vulgaris, Cladosporium cladosporioides, Cyanophyta anabaena, Cyanophyta oscillatoria, Cyanophyta* (blue-green) sp., *Dreschslera australiensis, Epidermophytan* sp., *Gliomatix cerealis, Gloephyllum trabeum, Gonium* sp., *Microsporium* sp., *Microsporium audouinii, Monilia grisea, Oscillatoria* sp., *Penicillium chrysogenum, Penicillium commune, Penicillium funiculosum, Penicillium pinophillium, Penicillium variable, Phoma fimeti, Pitomyces chartarum, Poria placenta, Pullularia pullans, Scenedesmus, Saccharomyces cerevisiac, Scolecobasidium humicola, Selenastrum gracile, Selenastrum* sp. *Trichoderma viride, Trichophyton interdigital, Trichophyton maidson, Trichophyton mentagrophytes, Trichophyton* sp.; viruses, e.g., adenovirus Type II & IV, bovine adenovirus Type I & IV, feline pneumonitis, herpes simplex Type I, herpes simplex Type II, HIV-1, influenza A2 (aichi), influenza A2 (Asian), Influenza B, mumps, parainfluenza (Sendai), rous sarcoma, reovirus Type I, simian virus 40, vaccinia, MS2, PRD1; protozoa parasites, e.g., *Cryptosporidium parvum*.

In an application of the modular system 100 according to an embodiment, the zeolite filter media is inserted into the first module 400. In a water treatment and purification application, e.g., pool treatment, the first module 400 facilitates the zeolite filter media to be in contact with the water to be treated through the mesh 402 but in an enclosed environment, allowing for the zeolite filter media to be contained while providing an optimal surface area of the zeolite filter media in contact with the water. The active ingredient of the anti-bacterial or anti-fungal agents are suspended in the water and applied to the zeolite surface, where cell formation of the silicon membrane is triggered. As the evaporation of the water occurs, strong chemical bond are created connecting the active ingredient to the zeolite surface, which forms a positively charged spear-like formation on the surface. This positively charged formation attracts negatively charged pathogens in the water, and the pathogens' cell wall are pierced by the spear-like formation. Further, the pathogens are electrocuted by the positive charge. As such, the pathogens are physically destroyed and eliminates the possibility of resistance and mutation to other biologically oriented methods of killing the pathogens. Further, the zeolite filter material is not consumed in this process, thereby allowing the process to continue undiminished.

In a preferred embodiment, the zeolite filter media for the first module 400 includes ZEOBEST® and ZEOBEST® Ultra. In another embodiment, other commercially or otherwise available zeolite filter media may be used.

Figure 5:
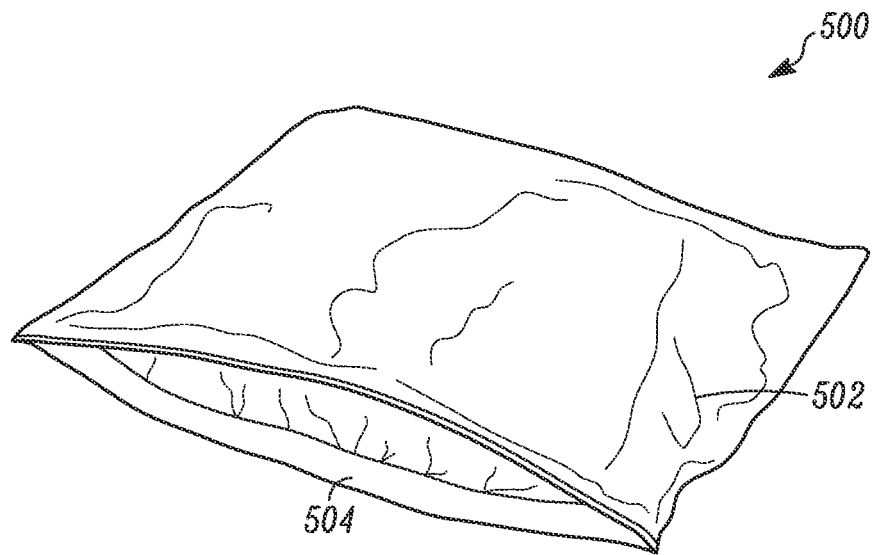
FIG. 5 illustrates an exemplary open perspective view of a second internal module according to an embodiment of the invention.
Figure 6:
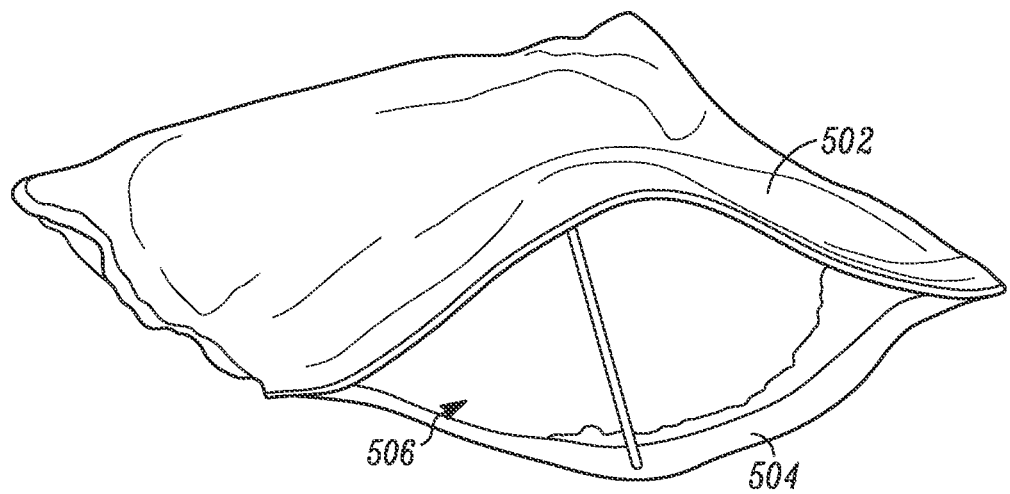
FIG. 6 illustrates an exemplary open view of the module of FIG. 5 with an additive according to an embodiment of the invention.

FIG. 5 illustrates an exemplary open perspective view of a second internal module according to an embodiment of the invention. FIG. 6 illustrates an exemplary open view of the module of FIG. 5 with an additive according to an embodiment of the invention.

Referring to FIG. 5, the second module is generally depicted with reference to number 500. The second module 500 is configured to fit within the main module 100. The second module includes transition metal mesh 502 configured to allow fluid to enter and exit the main module and a resealable end 504. The resealable end 504 may include any temporary coupling mechanism, e.g., hook and loop, zipper, snaps, buttons, folds, and any combination of the same. The other sides of the module are sealed or closed. The second module 500 may be constructed of and include any material as described with respect to the main module 100 in FIGS. 1-3 above.

The second module 500 is configured to receive sea salt 506. The sea salt is in a granular form according to an embodiment. The sea salt 506 may be replaced by utilizing the resealable seal 504. Moreover, other sea salt products for bacterial and fungus control may be included, e.g., Dead Sea, Pacific, Atlantic, and Himalayan sea salts in powder, crushed, liquid and crystal form. The second module 500 may also be disposable and include these components in a non-resealable module. In addition or alternative to sea salt a sodium percarbonate may be utilized.

In one embodiment, sea salt 506 may include an ammonium salt, e.g., silicone quaternary ammonium salt. For example, sea salt 506 may include Sanitect as discussed above.

Figure 7:
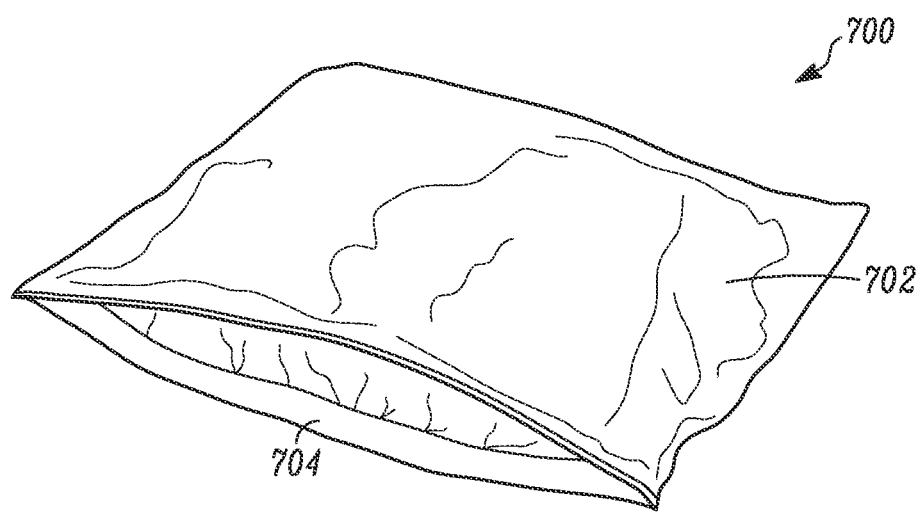
FIG. 7 illustrates an exemplary open perspective view of a third internal module according to an embodiment of the invention.

FIG. 7 illustrates an exemplary open perspective view of a third internal module according to an embodiment of the invention.

Referring to FIG. 7, the third module is generally depicted with reference to number 700. The third module 700 is configured to fit within the main module 100. The third module includes transition metal mesh 702 configured to allow fluid to enter and exit the main module and a resealable end 704. The resealable end 704 may include any temporary coupling mechanism, e.g., hook and loop, zipper, snaps, buttons, folds, and any combination of the same. The other sides of the module are sealed or closed. The third module 700 may be constructed and include any material as described with respect to the main module 100 in FIGS. 1-3 above.

The third module 700 is configured to receive an adsorbent material and/or an absorbent material. The adsorbent material may include microporous materials, e.g., aluminosilicate minerals, zeolite, and combinations of the same. Moreover, the adsorbent material may be treated with one or more of natural anti-bacterial and anti-fungal components including tea tree oil, pine tree oil or materials, e.g., pine needles, aloe vera, aloe vera oil, colloidal silver, meso silver, citrus materials, hydrogen peroxide, e.g., organic hydrogen peroxide, and combinations of the same.

In one embodiment, the adsorbent material is treated by heating one or more of the anti-bacterial and anti-fungal components with the adsorbent to a temperature in a range from about 250° F. to about 450° F. for a time in a range from about 10 minutes to about 30 minutes. In a preferred embodiment, zeolite and pine tree needles are heated to a temperature in a range from about 250° F. for a time of about 15 minutes. This addition of the anti-bacterial and anti-fungal components to the adsorbent configured to provide time releasable purifying properties, e.g., prolonged time release anti-bacterial and/or anti-microbial properties to mitigate bacteria and/or fungus.

In one embodiment, the adsorbent material may include the zeolite filter media as discussed above, with at least the zeolite contained in the zeolite filter media providing the adsorbent properties.

The third module 700 may also be disposable and include these components in a non-resealable module.

Figure 8:
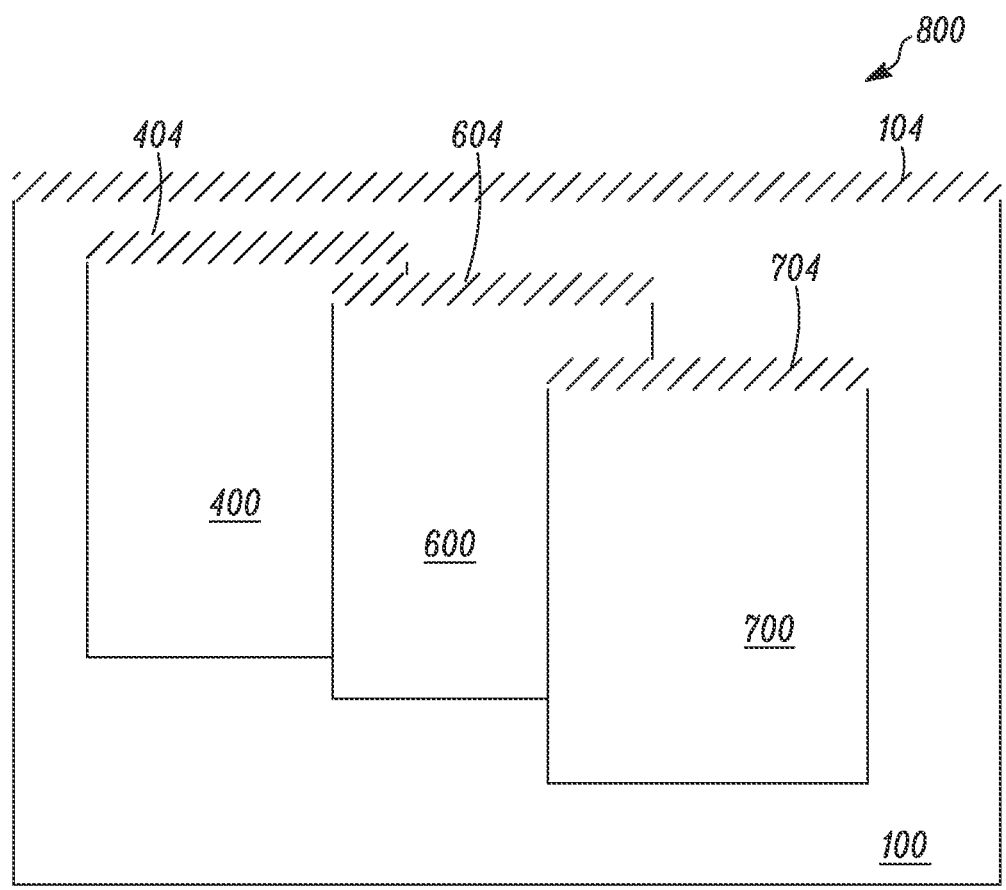
FIG. 8 illustrates an exemplary water treatment and purification modular system according to an embodiment of the invention.

FIG. 8 illustrates an exemplary water treatment and purification modular system according to an embodiment of the invention.

Referring to FIG. 8, the modular system is generally depicted as reference number 800. The modular system 800 includes a main module 100. The main module 100 includes a first module 400, a second module 600 and third module 700 as described herein. The first module 400, a second module 600 and third module 700 are arranged within an interior portion of the main module 100.

In another embodiment, modular system 800 may include additional modules, e.g., modules 400, 600, and 700. For example, modular system 800 may include two modules 400, e.g., one for each of pine needles and aloe vera, for additional natural anti-bacterial or anti-fungal properties. Additional modules 600 and 700 may be added likewise.

In a further embodiment, modules 400, 600, and 700 may include contents that includes a combination of the anti-bacterial, anti-fungal, sea salt, and adsorbent properties. For example, a zeolite filter media may be both anti-bacterial and adsorbent and may also include an ammonia salt as an active ingredient. As such, modular system 800 may use only one module in place of modules 400, 600, and 700.

Figure 9:
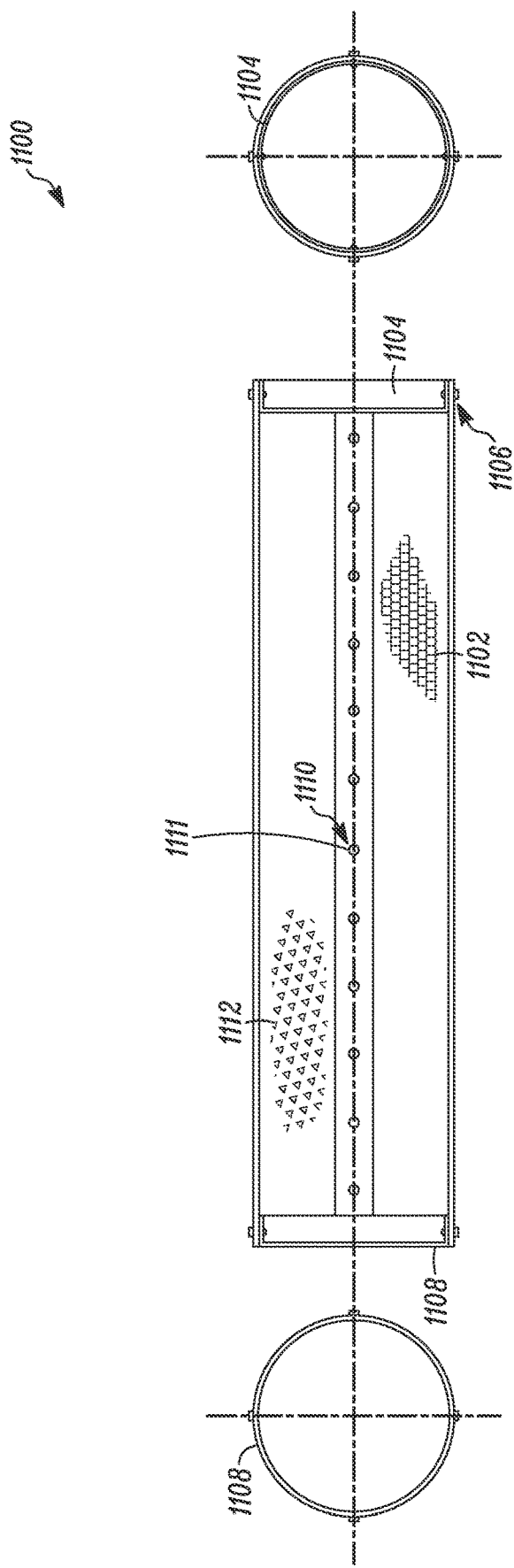
FIG. 9 illustrates an exemplary cross-sectional view of a main module according to an embodiment of the invention.

FIG. 9 illustrates an exemplary cross-sectional view of a main module according to an embodiment of the invention.

Referring to FIG. 9, the main module is generally depicted with reference to number 1100. The module 1100 includes transition metal mesh 1102 configured to allow fluid to enter and exit the main module 1100 and resealable end 1104. The resealable end 1104 (top end) may include any temporary coupling mechanism 1106, e.g., hook and loop, zipper, snaps, buttons, folds, and combination of the same. The other end 1108 (bottom end) of the module is sealed or closed, e.g., with a copper rivet or other copper coupling mechanism.

A portion of the module may include a fabric material, e.g., cloth, or strips of fabric material. In this embodiment, the material is sealed with a seam 1110 including a fastening mechanism, e.g., rivets, stitches, etc. The material may include a first side of the module that is fabric and a second side that is transition metal mesh. The mesh size is about ¼ inch or less. In a preferred embodiment, the metal mesh size includes about 100 to about 200 holes per inch mesh. The main module has a preferred length of about 5 inches to about 12 inches, width of about ½ inch to about 2 inches, and height of about 10 inches to about 14 inches. Of course, the size of the system depends on the amount of water being treated, i.e., the larger volume of water being treated, the larger the size of the system.

The transition metal mesh may include any transition metal with antibacterial or antimicrobial effects, e.g., a transition metal oxide, a transition metal salt, silver, silver oxide, silver salt, and combinations of the same. In a preferred embodiment, the transition metal includes copper or a coppery alloy. The metal mesh or fabric may be impregnated, laced, and/or coated with anti-microbial and/or antifungal materials. Moreover, the transition metal may be utilized as a component to one of the modules in any shape, e.g., mesh, non-mesh and the like.

Examples of transition metal salts suitable for use in the invention include, but are not limited to, AgCl, AgBr, AgI, $Ag_2S$, $Ag_3PO_4$, $NaAg_2PO_4$, CuS, and $NaCuPO_4$. Other examples of silver compounds include, but are not limited to, $AgNO_3$, $Ag_2CO_3$, AgOAc, $Ag_2SO_4$, $Ag_2O$, $[Ag(NH_3)_2]Cl$, $[Ag(NH_3)_2]Br$, $[Ag(NH_3)_2]I$, $[Ag(NH_3)_2]NO_3$, $[Ag(NH_3)_2]_2SO_4$, silver acetoacetate, a silver benzoate, a silver carboxylate, and silver amine complexes such as $[Ag(NR_3)_2]X$, where R is an alkyl or aryl group or substituted alkyl or aryl group and X is an anion such as, but not limited to, $Cl^-$, $Br^-$, $I^-$, $OAc^-$, $NO_3^-$ and $SO_4^{2-}$. In another embodiment, the transition metal is coated with materials as described in U.S. Patent Application Publication No. 2012/02555312, which is hereby fully incorporated by reference.

The module 1100 is configured to receive one or more anti-microbial and/or antifungal materials 1112. These anti-microbial and/or antifungal plastic materials may include plastic materials that are configured in a mesh structure, thereby increasing the surface area and contact with a fluid in use. The plastic materials are configured to inhibit the growth of odor causing bacteria, fungus and mold and are non-allergenic. In one embodiment, the main module includes this plastic material in a bag form and excludes the transition metal, i.e., the anti-microbial bag replaces the metal mesh. The bag is configured in a mesh sized to allow fluid to pass through the bag.

In a preferred embodiment, the antimicrobial plastic includes an antimicrobial agent incorporated into a thermoplastic fiber, e.g., a recycled poly ethylene teraphlate fiber made from recycled plastic bottles. The fiber can be spun into any shape, e.g., bag, mesh, combinations of the same and the like. The antimicrobial agent may include a bacteriostic material configured to inhibit growth and/or bacteriocidal material configured to kill or minimize bacteria. The materials may be arranged in separate modules, e.g., metal mesh modules. In a preferred embodiment, the materials include zeolite and activated carbon, e.g., fifty percent zeolite and fifty percent activated carbon. The activated carbon may be carbon pellets in a size range of about ⅛ inch pellet to about ⅜ inch pellet.

Other components include time released natural anti-bacterial and anti-fungal components including tea tree oil, pine tree oil or materials, e.g., pine needles, aloe vera, aloe vera oil, colloidal silver, meso silver, citrus materials, hydrogen peroxide, e.g., organic hydrogen peroxide, and combinations of the same. These materials may be in any form, e.g., powder form, solid form, liquid form, coated on a substrate, e.g., cloth material, and any combinations of the same. Moreover, these materials may be in separate disposable bags, e.g., cloth bags, inside the first module.

Other components may include sea salt in a granular form. Moreover, other sea salt products for bacterial and fungus control may be included, e.g., Dead Sea, Pacific, Atlantic, and Himalayan sea salts in powder, crushed, liquid and crystal form. In addition or in alternative to sea salt, a sodium percarbonate may be utilized.

The components may also include an adsorbent material and/or an absorbent material. The adsorbent material may include microporous materials, e.g., aluminosilicate minerals, zeolite, and combinations of the same. Moreover, the adsorbent material may be treated with one or more of natural anti-bacterial and anti-fungal components including tea tree oil, pine tree oil or materials, e.g., pine needles, aloe vera, aloe vera oil, colloidal silver, meso silver, citrus materials, hydrogen peroxide, e.g., organic hydrogen peroxide, and combinations of the same.

In one embodiment, the adsorbent is treated by heating one or more of the anti-bacterial and anti-fungal components with the adsorbent to a temperature in a range from about 250° F. to about 450° F. for a time in a range from about 10 minutes to about 30 minutes. In a preferred embodiment, zeolite and pine tree needles are heated to a temperature in a range from about 250° F. for a time of about 15 minutes. This addition of the anti-bacterial and anti-fungal components to the adsorbent are configured to provide time releasable purifying properties, e.g., prolonged time release anti-bacterial and/or anti-microbial properties to mitigate bacteria and/or fungus.

In one embodiment, the anti-bacterial and anti-fungal components, sea salt, and adsorbent material include one or more zeolite filter media. The zeolite filter media includes a zeolite material, e.g., analcime ($Na_{16}[Al_{16}Si_{32}O_{96}].16H_2O$), chabazite ($(Ca_{0.5},Na,K)_4[Al_4Si_8O_{24}].12H_2O$), clinoptilolite ($(Na,K)_6[Al_6Si_{30}O_{72}].20H_2O$), erionite ($K_2(Na,Ca_{0.5})_8[Al_{10}Si_{26}O_{72}].28H_2O$, heulandite ($(Na,K)Ca_4[Al_9Si_{27}O_{72}].24H_2O$), laumontite ($Ca_4[Al_8Si_{16}O_{48}].18H_2O$), mesolite ($Na_{16}Ca_{16}[Al_{48}Si_{72}O_{240}].64H_2O$), scolecite $Ca_8[Al_{16}Si_{24}O_{80}].24H_2O$, stilbite ($NaCa_4[Al_9Si_{27}O_{72}].30H_2O$), or other zeolite material (generally $M_{2/n}O[Al_2O_3.xSiO_2].yH_2O$, wherein M is any number of metals including Na, Li, Ka, Ca, and Mg, n is the valence of the metal cation, and x and y are the number of $SiO_2$ and $H_2O$, respectively. The zeolite material is adsorbent and acts as a catalyst for processes with other materials.

In a preferred embodiment, the composition of the zeolite filter media is 90%±5% of primarily clinoptilolite, e.g., hydrated sodium potassium aluminosilicate. In one embodiment, the zeolite filter media includes products known by ZEOBEST® Ultra.

The zeolite filter media may also include a number of anti-bacterial and anti-fungal agents, which includes copper-containing alloy products and other suitable products. For example, the zeolite filter media may include one or more active ingredients, which includes octadecylimethyl trihydroxysilyl propyl ammonium chloride (EPA Reg. No. 70087-E), e.g., Zoonocide®, 3-(trimethoxysilyl) propyldimethyloctadecyl ammonium chloride (EPA Reg. No. 88999-1), e.g., Sanitect, or other products as known now or may be derived in the art. The anti-bacterial and anti-fungal products may include various mixtures of active and inert ingredients. For example, a Zoonocide® filter media may contain 0.1% octadecylimethyl trihydroxysilyl propyl ammonium chloride and 99.9% inert ingredient. In another example, Sanitect agent may contain 72% 3-(trimethoxysilyl) propyldimethyloctadecyl ammonium chloride and 28% inert ingredient. The products may also contain a significant portion of a material, i.e., Sanitect agent may contain 12% methanol. The active ingredient of a zeolite filter media may be derived from plant base carbonate. The active ingredients may have a number of properties including anti-bacterial, anti-fungal, anti-algal, or other properties. The active ingredients may also in various forms, e.g., liquid, salt, or other forms.

In an embodiment, the anti-bacterial and anti-fungal agents may be used to destroy or inactivate a number of various pathogens, including gram positive bacteria, gram negative bacteria, fungi, algae, mold, yeast, spores, protozoa parasites, and viruses. For example, Sanitect may be used against a number of pathogens, as follows: gram positive bacteria, e.g., *Bacillus* sp. (vegetative cell), *Bacillus subtilis, Clostridium difficule, Corynebacterium diptheriae, Entero-*

*coccus* sp. (incl. VRE), *Micrococcus* sp., *Mycobaterium tuberculosis, Mycobacterium smegmatis, Propionibacterium acnes, Staphylococcus aureus, Staphylococcus aureus* (MRSA), *Staphylococcus epidermis, Streptococcus faecalis, Streptococcus mutans, Streptococcus pneumonia, Streptococcus pyogenes*; gram negative bacteria, e.g., *Actinetobacter aerogenes, Actinetobacter calcoaceticus, Aerobacter aerogenes, Aeromonas hydrophilia, Citrobacter deversus, Citrobacter freundi, Enterobacte aerogenes, Enterbacter aglomerans, Enterbacter cloacae, Enterococcus* sp., *Escherichia coli, Klebsiella oxytoca, Klebsiella pneumoniae, Klebsiella terriena, Legionella pneumophila, Morganeella morganii, Mycobacterium tuberculosis, Proteus mirabilis, Proteus vulgaris, Pseudomonas aeruginosa, Pseudomonas fluorscens, Psuedomonas pulida, Salmonella cholera suis Salmonella typhimunium, Salmonella typhosa, Serratia liquifaciens, Serratia marcescens, Treponema hyodysenteriae, Xanthomonas campestris*; fungi, algae, mold, yeast, and spores, e.g., *Alterania* alternate *Aphanizomenon* sp. *Aspergillus flares, Aspergillus flavus, Aspergillus niger, Aspergillus sydowii, Aspergillus terreus, Aspergillus versicolor, Aspergillus verrucari, Anabaena cylindrica, Aureobasidium pullans, Candida albicans Candida pseudotropocalis, Cephaldascus fragans, Chaetomium globsum, Chlorophyta protococcus, Phlorophyta selenastrum, Chlorophyta* sp., *Chrysophta* sp. *Chlorella vulgaris, Cladopsorium cladosporioides, Cyanophyta anabaena, Cyanophyta oscillatoria, Cyanophyta* (blue-green) sp., *Dreschslera australiensis, Epidermophytan* sp., *Gliomatix cerealis, Gloephyllum trabeum, Gonium* sp., *Microsporium* sp., *Microsporium audouinii, Monilia grisea, Oscillatoria* sp., *Penicillium chrysogenum, Penicillium commune, Penicillium funiculosum, Penicillium pinophillium, Penicillium variable, Phoma fimeti, Pitomyces chartarum, Poria placenta, Pullularia pullans, Scenedesmus, Saccharomyces cerevisiac, Scolecobasidium humicola, Selenastrum gracile, Selenastrum* sp. *Trichoderma viride, Trichophyton interdigital, Trichophyton maidson, Trichophyton mentagrophytes, Trichophyton* sp.; viruses, e.g., adenovirus Type II & IV, bovine adenovirus Type I & IV, feline pneumonitis, herpes simplex Type I, herpes simplex Type II, HIV-1, influenza A2 (aichi), influenza A2 (Asian), Influenza B, mumps, parainfluenza (Sendai), rous sarcoma, reovirus Type I, simian virus 40, vaccinia, MS2, PRD1; protozoa parasites, e.g., *Cryptosporidium parvum.*

In an application of the module 1100 according to an embodiment, the zeolite filter media is inserted into the metal mesh 1102. In a water treatment and purification application, e.g., pool treatment, the module 1100 facilitates the zeolite filter media to be in contact with the water to be treated through the mesh 1102 but in an enclosed environment, allowing for the zeolite filter media to be contained while providing an optimal surface area of the zeolite filter media in contact with the water. The active ingredient of the anti-bacterial or anti-fungal agents are suspended in the water and applied to the zeolite surface, where cell formation of the silicon membrane is triggered. As the evaporation of the water occurs, strong chemical bond are created connecting the active ingredient to the zeolite surface, which forms a positively charged spear-like formation on the surface. This positively charged formation attracts negatively charged pathogens in the water, and the pathogens' cell wall are pierced by the spear-like formation. Further, the pathogens are electrocuted by the positive charge. As such, the pathogens are physically destroyed and eliminates the possibility of resistance and mutation to other biologically oriented methods of killing the pathogens. Further, the zeolite filter material is not consumed in this process, thereby allowing the process to continue undiminished.

Any component described herein may be replaced and added with the releasable end 1106.

FIG. 10 illustrates an exemplary cross-sectional view of a main module according to another embodiment of the invention.

Referring to FIG. 10, the main module is previously described herein with reference to FIG. 9. FIG. 10 includes an optional support structure 1200 configured to hold the module above an opening of filter when the module 1100 is used in a filter (FIGS. 11-12) in order to prevent the module 100 from blocking or substantially minimizing flow through the opening. In an embodiment, the metal mesh may be held by a seam 1211 using a fastening mechanism 1210. In this embodiment, the fastening mechanism may be a metal rivet, e.g., copper rivet, that lines the length of seam 1211. In a preferred embodiment, the length of the support structure 1200 is 6 inches and the seam 1211 is lined by 12 copper rivets. In one embodiment, the top (resealable) end 1104 may also be lined with fastening mechanisms 1205. In this embodiment, the fastening mechanism 1205 may be 4 copper rivets evenly-spaced (at 90 degrees with each other) apart.

Figure 13:
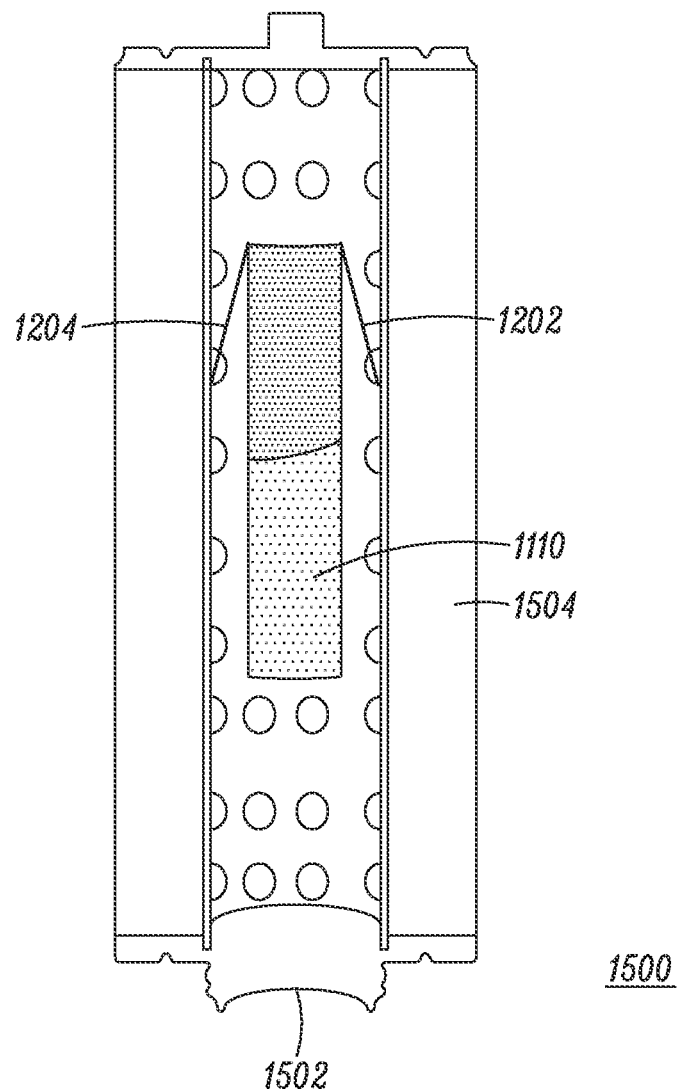
FIG. 13 illustrates an exemplary cross-sectional view of a main module inside a filter apparatus according to another embodiment of the invention.

The support structure 1200 may include any mechanism to support the module 1100, e.g., radial support mechanism, linear support mechanism, and combinations of the same. In this embodiment, the support structure 1200 includes one or more wings 1202, 1204 configured to expand, e.g., resilient wings configured to expand due to the nature of the material the wings are constructed with (FIG. 13). The expansion of the wings may also occur upon the application of mechanism, e.g., spring loaded mechanism, elastic mechanism, or other type of mechanism configured to move the wings from a first location (no expanded—parallel to side of the unit) to a second location (at angle greater than 5 degrees from the side of the unit). In one embodiment, the wings 1202, 1204 include a memory metal configured to expand to an extended position in a natural state. The expanding position in FIG. 10 is an expanded natural state of the metal. FIG. 13 illustrates an exemplary view of a main module inside a filter apparatus according to an embodiment of the invention. Upon application of the module 1100 placed into the apparatus, the wings are collapsed and when in position the wings expand and lock the filter into a vertical position.

Referring to FIG. 13, the filter 1500 includes a main module 1100 vertically positioned above and/or below an inlet 1502 and/or exit 1502 of the filter 1500. The filter 1500 can be used in a spa and/or pool. The filter 1500 may also be used in an aquarium. The filter 1500 includes a filter media 1504 and is configured to receive a main module 1100. The module 1100 includes a support mechanism 1202, 1204 configured to be releasably or permanently fixed within an interior portion of the filter 1500. The support structures allows the module 1100 to be positioned in a fixed place to prevent obstruction of the filter 1500 opening and/or closing 1502.

Figure 11A:
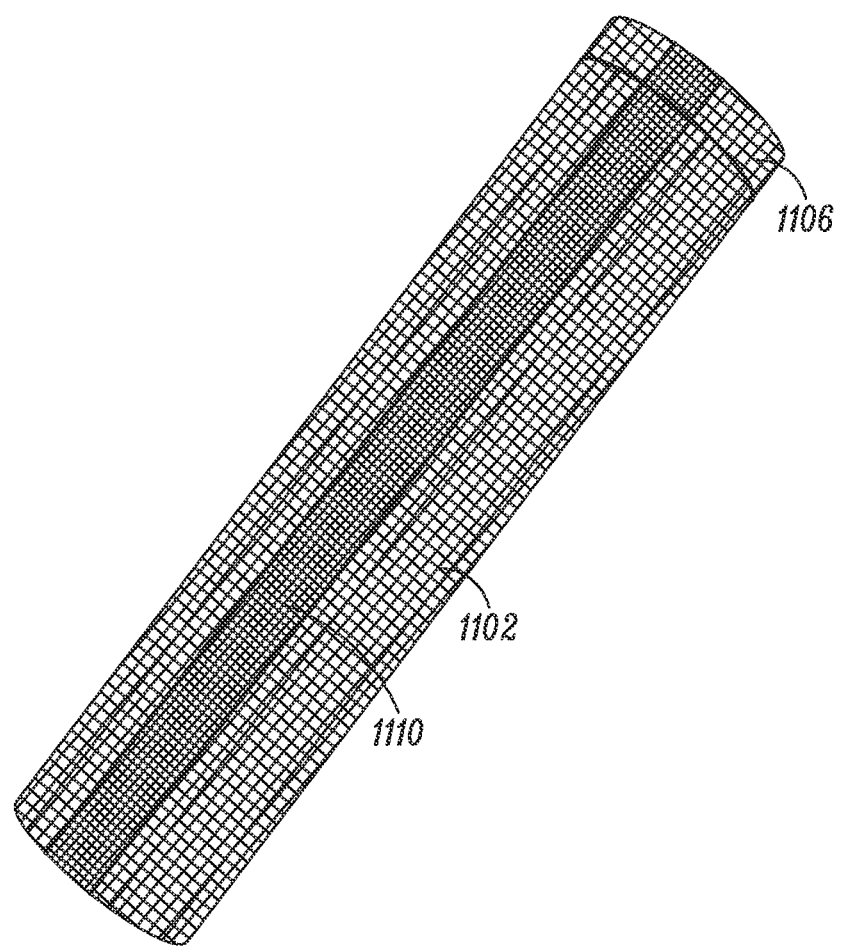
FIG. 11A illustrates an exemplary perspective view of a main module according to another embodiment of the invention.
Figure 11B:
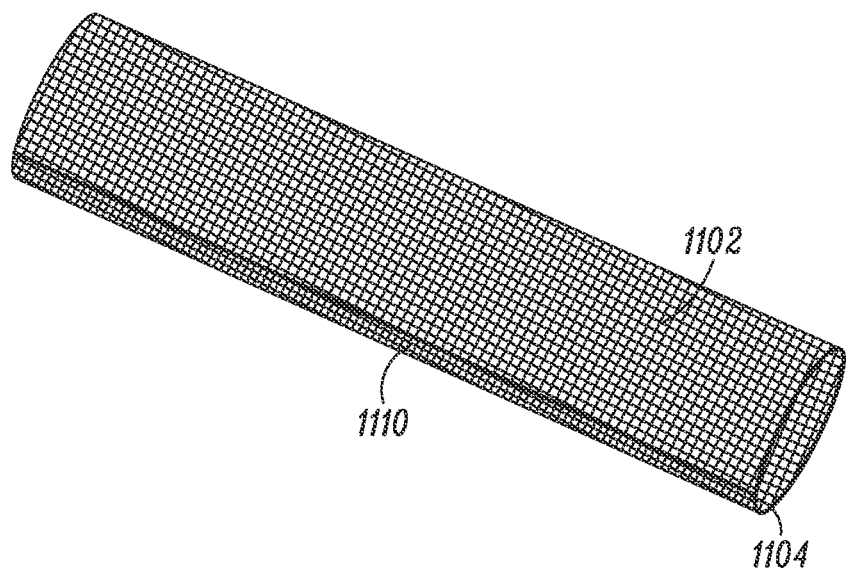
FIG. 11B illustrates an exemplary perspective view of a main module according to FIG. 11A in a first orientation.
Figure 11C:
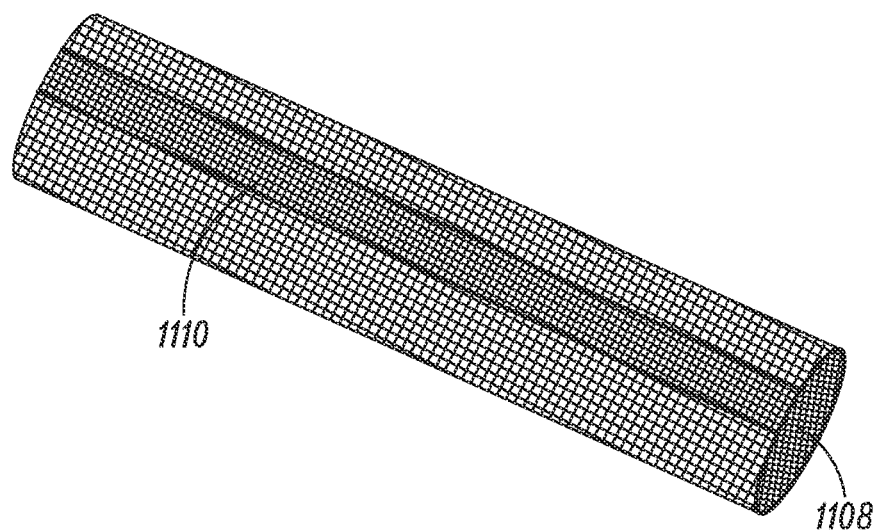
FIG. 11C illustrates an exemplary perspective view of a main module according to FIG. 11A in a second orientation.
Figure 11D:
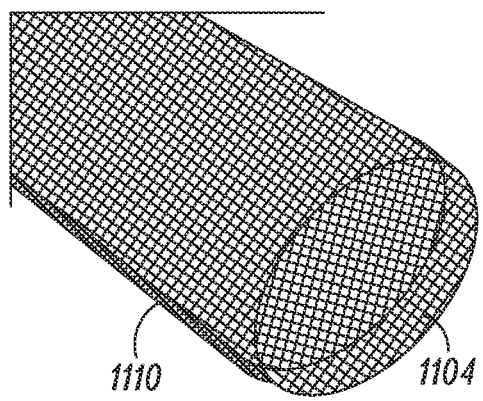
FIG. 11D illustrates an exemplary enlarged view of end portion of FIG. 11B.
Figure 11E:
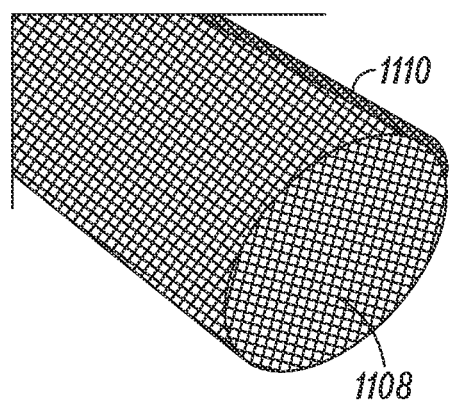
FIG. 11E illustrates an exemplary enlarged view of end portion of FIG. 11C.

FIG. 11A illustrates an exemplary perspective view of a main module according to another embodiment of the invention. FIG. 11B illustrates an exemplary perspective view of a main module according to FIG. 11A in a first orientation. FIG. 11C illustrates an exemplary perspective view of a main module according to FIG. 11A in a second orientation. FIG. 11D illustrates an exemplary enlarged view of end portion of FIG. 11B. FIG. 11E illustrates an exemplary enlarged view of end portion of FIG. 11C. FIGS. 11A-11E are described with reference to FIG. 9 herein.

Figure 12:
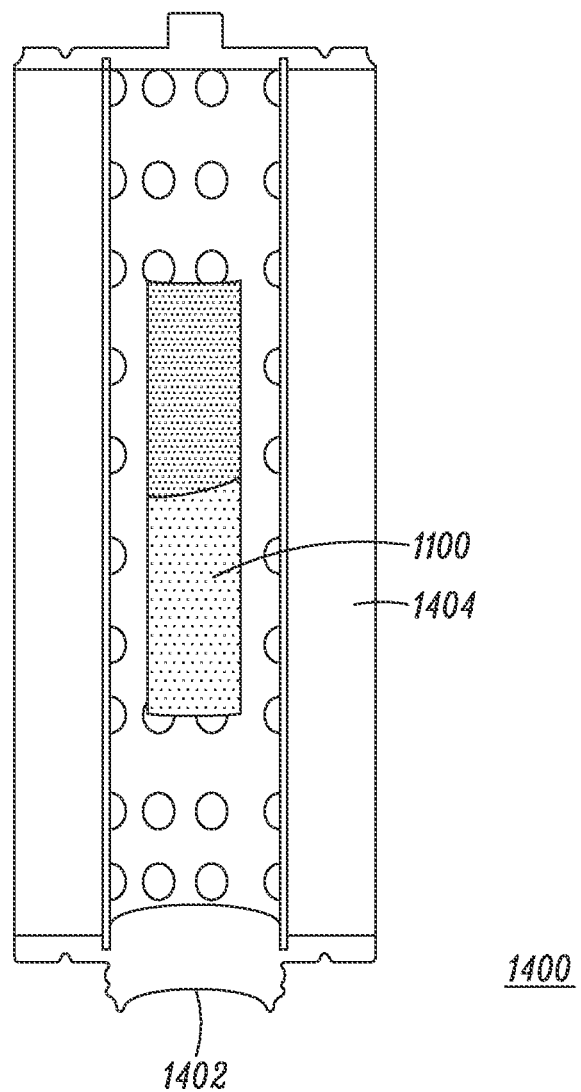
FIG. 12 illustrates an exemplary cross-sectional view of a main module inside a filter apparatus according to an embodiment of the invention.

FIG. 12 illustrates an exemplary cross-sectional view of a main module inside a filter apparatus according to an embodiment of the invention.

Referring to FIG. 12, the filter 1400 includes a main module 1100 vertically positioned above and/or below an inlet 1402 and/or exit 1402 of the filter 1400. The filter 1400 can be used in a spa and/or pool. The filter 1400 may also be used in an aquarium. The filter 1400 includes a filter media 1404 and is configured to receive a main module 1100. The module 1100 includes a support mechanism (not shown) or is sized, e.g., oversized, configured to be releasably or permanently fixed within an interior portion of the filter 1400. The support structures or sizing allows the module 1100 to be positioned in a fixed place to prevent obstruction of the filter 1400 opening and/or closing 1402. The interior and exterior of the filter 1400 is porous to allow the water to reach the main module 1100. In a preferred embodiment, the interior and exterior of the filter 1400 contain sized holes to allow the water to reach the main module 1100. Filter 1400 may be made of metal, plastic, or other materials.

FIG. 13 illustrates an exemplary cross-sectional view of a main module without components inside a filter apparatus according to another embodiment of the invention.

Referring to FIG. 13, the filter 1500 includes a main module 1100 vertically positioned above and/or below an inlet 1502 and/or exit 1502 of the filter 1400. The filter 1500 can be used in a spa and/or pool. The filter 1500 may also be used in an aquarium. The filter 1500 includes a filter media 1504 and is configured to receive a main module 1100. The module 1100 includes one or more wings 1202, 1204 configured to expand as discussed with respect to FIG. 10, e.g., resilient wings configured to expand due to the nature of the material the wings are constructed with. The expansion of the wings may also occur upon the application of mechanism, e.g., spring loaded mechanism, elastic mechanism, or other type of mechanism configured to move the wings from a first location (no expanded—parallel to side of the unit) to a second location (at angle greater than 5 degrees from the side of the unit). In one embodiment, the wings 1202, 1204 include a memory metal configured to expand to an extended position in a natural state. Upon application of the module 1100 placed into the filter 1500, the wings 1202, 1204 are collapsed and when in position the wings expand and lock the filter into a vertical position. The wings 1202, 1204 allow the module 1100 to be positioned in a fixed place to prevent obstruction of the filter 1500 opening and/or closing 1502.

Figure 14:
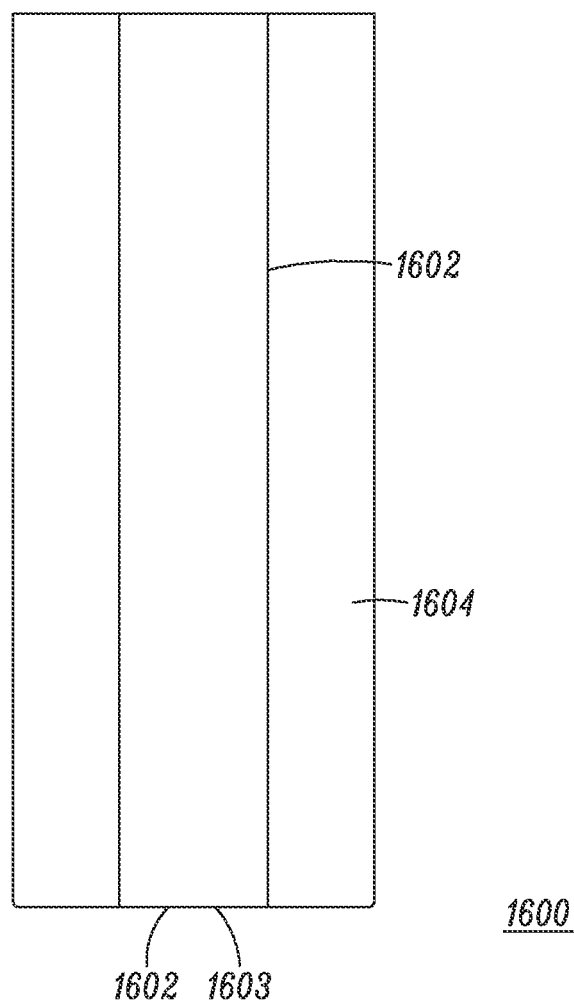
FIG. 14 illustrates an exemplary cross-sectional view of another embodiment of the invention.

FIG. 14 illustrates an exemplary cross-sectional view of another embodiment of the invention.

Referring to FIG. 14, the filter 1600 includes a main module 1602 as described herein with reference to the module 1100. The main module 1602 is integrated into the filter 1600 and also has a resealable end to add or subtract components, e.g., antibacterial, antifungal, and/or other components described herein. The filter 1600 can be used in a spa, pool, aquarium, fish tank or other water containment apparatus as needed. The filter 1600 includes a filter media 1604 for further filtering as known in the art. The filter 1600 includes an entrance and/or exit 1603 for fluid as known in the art.

In an embodiment, filter media 1404, 1504, and 1604 may be of various outer length and width and of various inner radius for accommodating the main modules 1402, 1502, and 1602, respectively. In one embodiment, the filter media, 1404, 1504, and 1604 may be sized to fit into existing slots for a filter media for the application, e.g., a spa, pool, aquarium, fish tank. In a further embodiment, the resealable end of filter media 1100, 1112, and 1604 facilities the addition and removable of components, e.g., antibacterial, antifungal, and/or other components described herein, and the main modules 1402, 1502, and 1602 as needed, i.e., components and main modules may be added or removed through the ends 1402, 1502, and 1603, of the filters. while the corresponding filter media is fitted into the existing slots for the application.

In an appliance of the modules described herein, e.g. modules 100, 1100, and 1200, according to a further embodiment, the modules may be placed at or near a position where water enters or leaves the system to be treated, i.e., the entrance/exit of the water circulation system for a pool or aquarium. As such, water flow within the system is ensured to pass through the modules and the filtering effect of the content of the modules is effectuated.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of using a disposable filter insert for a spa or pool, comprising:

providing a filter insert, the filter insert comprising a cylindrical main module including a first closed end, a second closed end, and an interior portion arranged within an interior of the cylindrical main module, a plurality of treated filter porous media materials arranged within an interior portion of the cylindrical main module, wherein the plurality of treated filter media materials are treated with one or more active ingredients including octadecyldimethyl trihydroxysilyl propyl ammonium chloride and 3-(trimethoxysilyl) propyldimethyloctadecyl ammonium chloride and one or more inert ingredients and the one or more active ingredients are chemically bonded to the plurality of treated filter porous media materials; and arranging the filter insert into a lumen of an existing filter insert or arranging the filter insert into a filter region of a pool or a spa.

2. The method of claim 1, wherein the filter insert further comprises a transition metal mesh, the transition metal mesh includes an array of open cells configured to allow fluid to enter and exit the interior portion of the cylindrical main module.

3. The method of claim 1, further comprising the step of removing the filter insert from the pool or the spa.

4. The method of claim 1, further comprising the step of adding hydrogen peroxide to the spa or the pool.

5. The method of claim 1, further comprising the step of replacing the filter insert after a predetermined time period with a new filter insert.

6. The method of claim 1, further comprising the steps of:

providing a second filter insert, the second filter insert comprising a cylindrical main module including a first closed end, a second closed end, and an interior portion arranged within an interior of the cylindrical main module, a plurality of treated filter porous media materials arranged within an interior portion of the cylindrical main module, wherein the plurality of treated filter media materials are treated with one or more active ingredients including octadecyldimethyl trihydroxysilyl propyl ammonium chloride and 3-(trimethoxysilyl) propyldimethyloctadecyl ammonium chloride and one or more inert ingredients and the one or more active ingredients are chemically bonded to the plurality of treated filter porous media materials; and arranging the second filter insert into a lumen of the existing filter insert or arranging the second filter insert into the filter region of a pool or a spa.

7. A method of using a pool or spa filter, comprising the steps of:

providing the spa or hot tub filter insert, the filter insert comprising a main module comprising a plurality of treated zeolite porous filter media materials arranged within an interior portion of the main module, wherein the plurality of treated zeolite porous filter media materials are treated with one or more active ingredients including octadecyldimethyl trihydroxysilyl propyl ammonium chloride and 3-(trimethoxysilyl) propyldimethyloctadecyl ammonium chloride and one or more inert ingredients, wherein the one or more active ingredients are configured to form a positively charged chemical bond on a surface of the plurality of treated zeolite porous filter media materials; and arranging the filter into a lumen of an existing filter or arranging the filter insert into a filter region of a pool or a spa.

8. The method of claim 7, wherein the filter insert further comprises an anti-microbial material and antifungal plastic material arranged in the interior portion of the cylindrical main module, wherein the anti-microbial material comprises an ammonia salt, wherein the antifungal plastic material comprises a plurality of thermoplastic fibers arranged in a mesh type shape, the plurality of thermoplastic fibers comprising a bacteriostatic material configured to inhibit growth and a bacteriocide material configured to kill or minimize bacteria.

9. The method of claim 7, wherein the filter insert further comprising a plurality of untreated zeolite filter porous media materials arranged within the interior portion of the cylindrical main module.

10. The method of claim 7, wherein the filter insert further comprises time released natural anti-bacterial and anti-fungal components arranged in the interior portion of the main module.

11. The method of claim 7, further comprising the step of adding hydrogen peroxide to the spa or the pool.

12. The method of claim 7, further comprising the step of replacing the filter insert after a predetermined time period with a new filter insert.

13. The method of claim 7, further comprises a transition metal mesh, the transition metal mesh includes an array of open cells configured to allow fluid to enter and exit the interior portion of the cylindrical main module.

14. The method of claim 7, wherein the transition metal mesh comprises copper.

15. The method of claim 7, wherein the filter insert further comprises a support member.

16. The method of claim 15, further comprising the steps of adjusting the support member to engage a portion of the pool or spa filter.

17. A method of using a pool or spa filter, comprising the steps of:

providing a pool or spa filter, wherein the filter comprises a main module comprising a plurality of treated zeolite media materials arranged in an interior portion of the main module, wherein the plurality of treated zeolite media materials are treated with one or more active ingredients including octadecyldimethyl trihydroxysilyl propyl ammonium chloride and 3-(trimethoxysilyl) propyldimethyloctadecyl ammonium chloride, and wherein the one or more active ingredients are chemically bonded to the plurality of treated zeolite media materials; and arranging the filter into a lumen of an existing filter or arranging the filter into a filter region of a pool or spa.

18. The method of claim 17, further comprising the step of adding hydrogen peroxide to the spa or the pool.

19. The method of claim 17, further comprising the step of replacing the filter after a predetermined time period with a new filter.

20. The method of claim 17, further comprises a transition metal mesh, the transition metal mesh includes an array of open cells configured to allow fluid to enter and exit the interior portion of the cylindrical main module.

* * * * *